United States Patent [19]

Usui et al.

[11] Patent Number: 4,986,116
[45] Date of Patent: Jan. 22, 1991

[54] AIR FLOW METER FOR INTERNAL COMBUSTION ENGINE

[75] Inventors: Toshifumi Usui, Katsuta; Atsushi Hohkita, Hitachi, both of Japan

[73] Assignees: Hitachi, Ltd., Tokyo; Hitachi Automotive Engineering Co., Ltd., Ibaraki, both of Japan

[21] Appl. No.: 419,338

[22] Filed: Oct. 10, 1989

[30] Foreign Application Priority Data

Oct. 18, 1988 [JP] Japan .................. 63-260469

[51] Int. Cl.⁵ .......................................... G01M 19/00
[52] U.S. Cl. ................................................. 73/118.2
[58] Field of Search ............... 73/118.2, 202.5, 204.11

[56] References Cited

U.S. PATENT DOCUMENTS

| | | | |
|---|---|---|---|
| 4,472,965 | 9/1984 | Knapp et al. | 73/118.2 |
| 4,478,075 | 10/1984 | Oyama et al. | 73/118.2 |
| 4,495,802 | 1/1985 | Kashiwaya et al. | 73/118.2 |
| 4,776,213 | 10/1988 | Blechinger et al. | 73/118.2 |
| 4,870,857 | 10/1989 | Smith | 73/118.2 |
| 4,873,641 | 10/1989 | Nagaishi et al. | 73/118.2 |
| 4,887,577 | 12/1989 | Arai et al. | 123/494 |

FOREIGN PATENT DOCUMENTS 58-109815  6/1983  Japan .
58-109816  6/1983  Japan .

*Primary Examiner*—Robert Raevis
*Attorney, Agent, or Firm*—Antonelli, Terry, Stout & Kraus

[57] ABSTRACT

An air flow meter for an internal combustion engine comprises an intake air passage of an internal combustion engine, which is composed of a primary flow passage and an auxiliary flow passage having a specified length and a portion adapted to project within the primary flow passage and made substantially parallel to the direction of the air flow passing through the primary flow passage. A sensor for measurement of an intake air flowrate is disposed within the auxiliary flow passage. The primary flow passage is provided with a portion where the cross-sectional area of the primary flow passage is gradually reduced. In the vicinity of this cross-sectional area reducing portion, there is disposed an outlet of the auxiliary flow passage.

15 Claims, 9 Drawing Sheets

AIR FLOW METER FOR INTERNAL COMBUSTION ENGINE

BACKGROUND OF THE INVENTION

The present invention relates to a hot-wire type air flow meter based on the use of an auxiliary flow passage and, more particularly, to an engine control device which is suitable for use as an intake air flow-rate sensor for a gasoline engine of an automobile.

In various internal combustion engines, particularly in a gasoline engine of an automobile, the range of control thereof is very wide in respect of the number of revolutions and output and the engine is subjected to strict regulation of exhaust gas. Therefore, an accurate air fuel ratio control is always required to be performed irrespective of the operational conditions of the engine.

Under the above-mentioned existing circumstances, a microcomputer-control type engine control device has in recent years been widely adopted in which the air fuel ratio or the ignition timing is controlled using a microcomputer operating on the basis of a synthetic decision on various operational conditions of the engine including an intake air flow thereof.

Meanwhile, what is called "hot-wire type air flow meter" has recently been employed as an air flow sensor for such engine control. Examples thereof are disclosed in Japanese Patent Unexamined Publications Nos. 58-109815 and 58-109816. In these prior art examples, an intake air passage of an internal combustion engine is constituted by a primary flow passage and auxiliary flow passage allowed to project within the primary flow passage and having a specified length, the auxiliary flow passage having a portion extending substantially in parallel with the flow of the air passing through the primary flow passage. Namely, said prior art examples show the hot-wire type air flow meter of auxiliary flow passage system, in which a sensor element for an intake air flowrate is disposed in said auxiliary flow passage.

An outlet of the auxiliary flow passage is opened in the vicinity of an enlarged section of the primary flow passage, or is opened at a straight pipe section.

However, in the above-described prior art, no consideration is given to the stability of air flow at the outlet of the auxiliary flow passage where the sensor element is disposed. Namely, the turbulence of air flow, which has nothing to do with the pulsation of air flow due to the revolutions of the engine involved, vigorously occurs at said outlet, thus raising a problem that such turbulence of air flow is likely to have undesirable effects upon the metering of the intake air flow rate.

To cope with this problem, a means for solving the same has been proposed in which a rectifying member such as a mesh member or honeycomb member is provided over the intake air flow passage so as to stabilize the flow of intake air. In this proposal, however, a considerable increase in manufacturing cost, inherently results.

SUMMARY OF THE INVENTION

An object of the present invention is to provide an air flow meter for use in an internal combustion engine which enables sufficient stabilization of air flow without employing any member likely to become a cause of rise in the manufacturing cost, thereby enabling measurement of air flow always with high accuracy.

The above object can be achieved by forming the configuration of a primary flow passage in such a manner that the flow of air in the primary flow passage is restricted in the vicinity of an outlet of the auxiliary flow passage.

The air flowing out of the auxiliary flow passage merges into the flow of air in the primary flow passage in the vicinity of the outlet of the auxiliary flow passage. In a region where the primary flow passage is restricted in the vicinity of the outlet of the auxiliary flow passage, the flow of air is compressed. That is, a straightening of the lines of flow takes place. In consequence, the flow of air around the sensor element within the auxiliary flow passage also is stabilized. In consequence, it is possible to obtain the result of detection in the flow of air having no turbulence.

DESCRIPTION OF THE PREFERRED EMBODIMENTS

An air flow meter for an internal combustion engine in accordance with the present invention will now be described in detail with reference to the illustrated embodiments.

Figure 1:
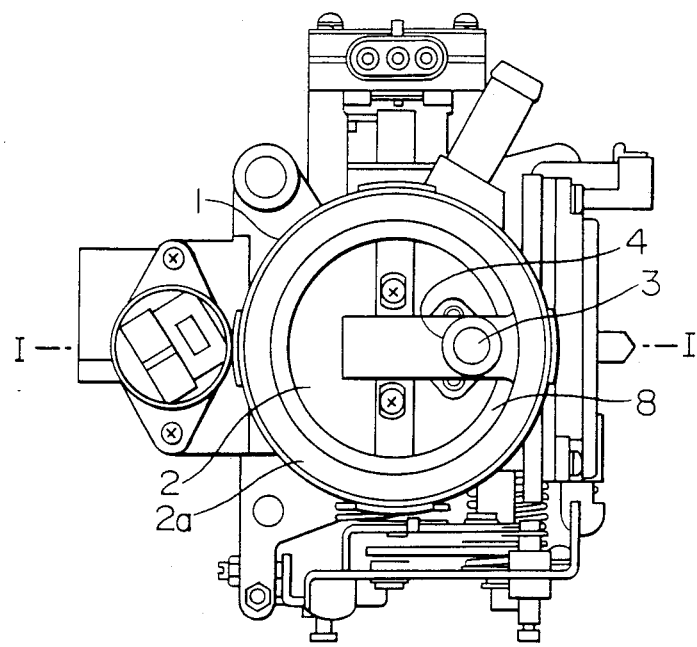
FIG. 1 is a plan view of an air flow meter for an internal combustion engine according to a first embodiment of the present invention.
Figure 2:
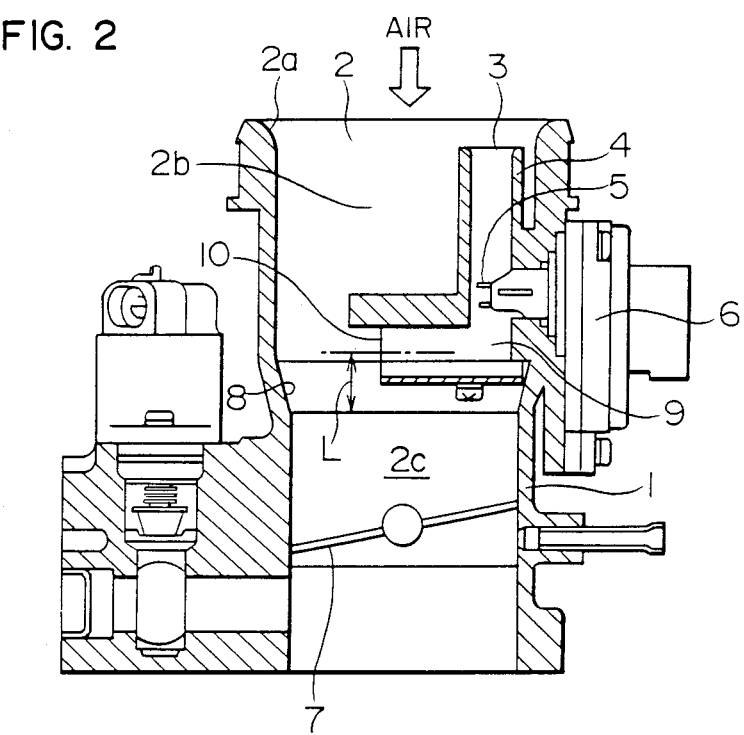
FIG. 2 is a side sectional view of the first embodiment.

FIGS. 1 and 2 show an air flow meter for an internal combustion engine in accordance with a first embodiment of the present invention. The air which has been taken in from an air cleaner (not shown) by a negative intake pressure of the engine is restricted in the form of a bell mouth at an inlet 2a of a throttle body 1. Thereafter, the flow of the air is divided into two parts, one of which passes through a primary flow passage 2 and the other of which passes through an auxiliary flow passage 3.

An inlet of the auxiliary flow passage 3 is shaped like a hollow cylinder and the axis thereof is in parallel with the axis of the primary flow passage 3. The auxiliary flow passage 3 is eccentrically disposed within the primary flow passage 2.

The air which flows into the auxiliary flow passage 3 passes through a cylindrical portion 4 having a length of 10 mm or more to reach a hot-wire element section 5. In this section 5, heat is taken away therefrom in accordance with the flow velocity of the air passing therethrough. Therefore, an electric current is supplied from a hot-wire module 6 to the section 5 in order to supplement the amount of heat thus lost.

By causing generation of the output proportional to the level of said electric current from the hot-wire element section 5, it is possible to obtain an output therefrom which corresponds to the flow velocity of the air. A specified quantity of fuel is supplied to the engine involved correspondingly to a level of that output, thus providing an optimum air fuel ratio with respect to the engine.

The primary flow passage 2 is constituted by an upstream portion 2b located at the inlet side of the throttle body 1 and having the auxiliary flow passage 3 disposed therewithin, a downstream portion 2c located at the outlet side of the throttle body 1 and having a throttle valve 7 disposed therewithin, and a tapered portion 8 located between the upstream portion 2b and the downstream portion 2c. The inner diameter of the downstream portion 2c is made smaller than that of the upstream portion 2b. The cross-sectional area of the upstream portion 2b is 1.1 times or more as large as that of the downstream portion 2c.

Meanwhile, as described above, the air which has entered and passed through the hot wire element 5 is caused to be bent at a bent portion at right angles. Then, the air is discharged from the outlet portion 10 of the auxiliary flow passage into the primary flow passage 2, thus merging into the air within the primary flow passage 2.

On the other hand, the air which flows into the primary flow passage 2 is caused to flow through the upstream portion 2b and is then restricted by a tapered portion 8 from which it advance toward the downstream portion 2c. Consequently, the action of linearizing the flow of air is performed, so that turbulence of the air flow is suppressed by the tapered portion 8 to make the air flow sufficiently stable.

The outlet 10 of the auxiliary flow passage 3, as shown, is located in the vicinity of the tapered portion 8 of the primary flow passage 2. More specifically, in FIG. 2, the distance L between the axis of the outlet portion 10 of the auxiliary flow passage 3 and the downstream end of the tapered portion 8 is made smaller than at least the radius of the primary flow passage 2. In an embodiment, the distance L is made smaller than that which is 1.1 times as large as the radius of the throttle valve 7.

Consequently, the air flowing through the auxiliary flow passage 3 is caused to flow out into the sufficiently stabilized air flow within the primary flow passage 2 in the vicinity of the tapered portion 8. Accordingly, the turbulence in the air flow in the vicinity of the hot-wire element section 5 also is sufficiently suppressed, whereby the air flow in the vicinity thereof is stabilized. As a result, measurement of the flow rate of the air is obtained while the air flow is sufficiently stabilized. Thus, it is possible to easily obtain highly accurately measured results.

In the first embodiment, as clear from the Figure, the direction of air which flows toward the outlet 10 of the auxiliary flow passage from the bent portion 9 is perpendicular to the axis of the throttle shaft.

Next, FIGS. 3 to 10 illustrate in detail an air flow meter for an internal combustion engine in accordance with a second embodiment of the present invention. The main construction thereof is the same as that of the air flow meter in accordance with the first embodiment of the present invention shown in FIGS. 1 and 2. Therefore, the same parts or sections as those shown in FIGS. 1 and 2 are denoted by like reference numerals, respectively.

Figure 3:
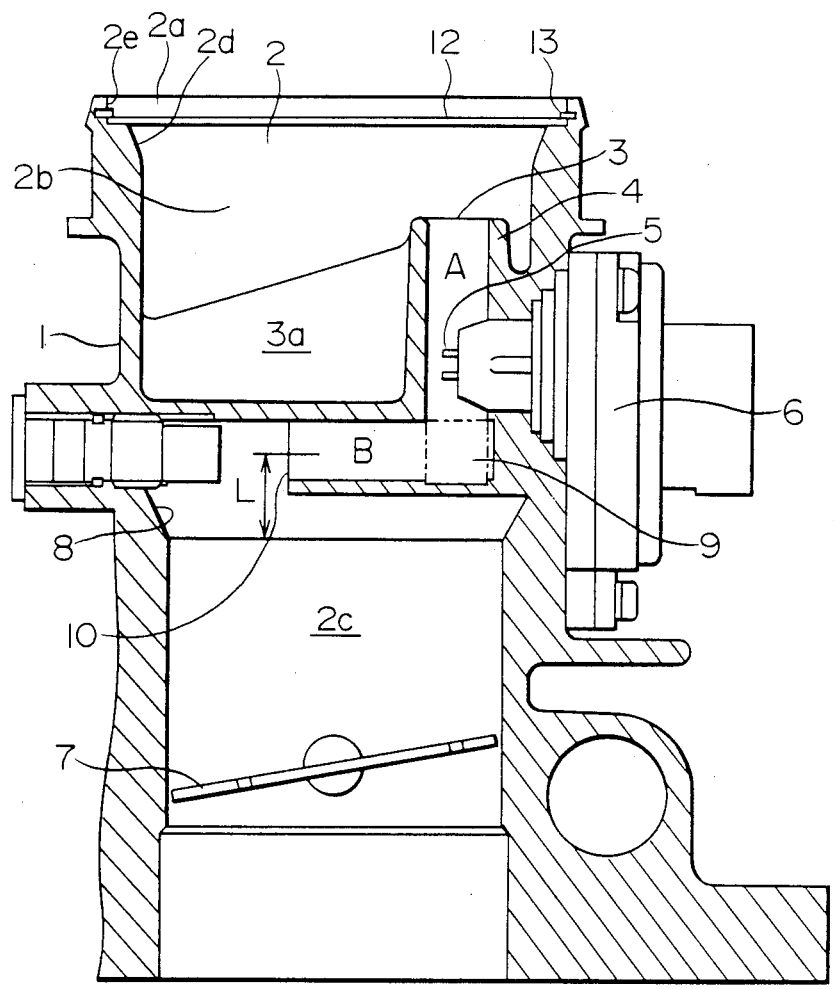
FIG. 3 is a side sectional view taken along line 3—3 in FIG. 4 of an air flow meter for an internal combustion engine according to a second embodiment of the present invention.
Figure 4:
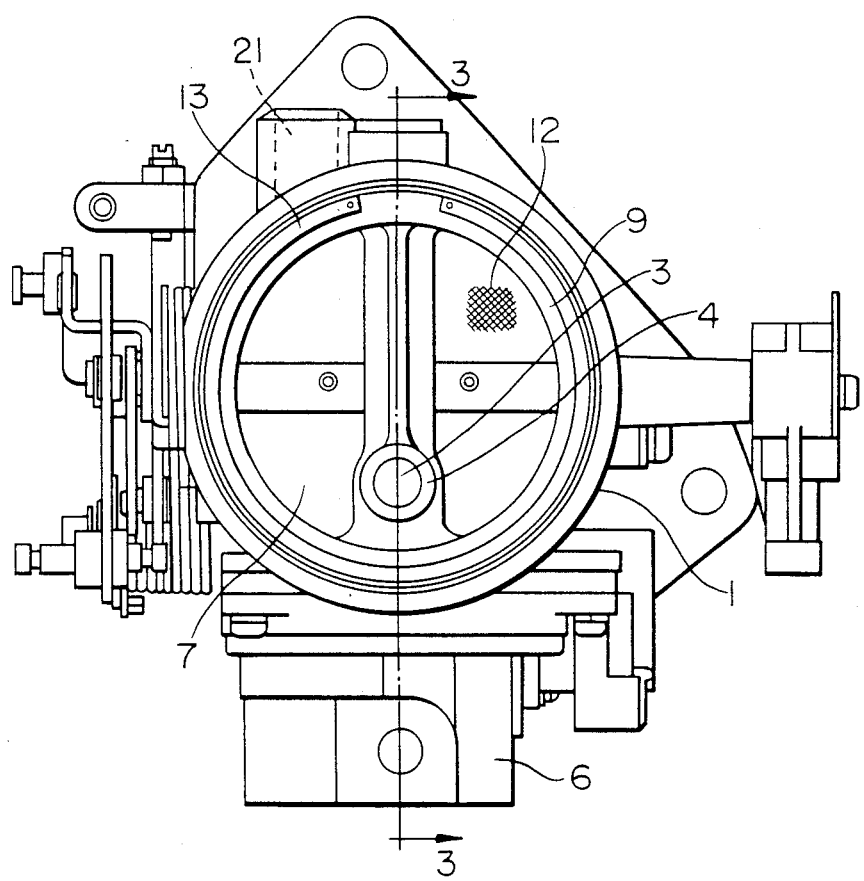
FIG. 4 is a plan view of the second embodiment of the present invention.

The primary flow passage 2 of the throttle body 1 is constructed as shown in FIG. 3. Namely, the inlet portion 2a is rounded or bell-mouthed so that the flow of air may be smoothly restricted. At the inlet portion 2a there is provided a stepped portion 2e at which a rectifying mesh 12 is fixed, the mesh 12 being pressed from above by a snap ring 13 so as to prevent the mesh 12 from being moved. The outer periphery of the mesh 12 is fixed by caulking a metallic member thereto so as to prevent the mesh 12 from being loosened. In the vicinity of the outlet 10 of the auxiliary flow passage, the primary flow passage 2 has its diameter sharply restricted at the tapered portion 8. At a midway of the tapered position 8 a refluxing port (not shown) for blowby gas is opened. The upstream portion 2b of the primary flow passage 2 between the inlet portion 2a and the tapered portion 8 has no change in diameter. The downstream portion 2c of the primary flow passage 2 located after restriction thereof made by the tapered portion 8 has no change in diameter up to a position downstream of a measuring portion of the throttle valve 7. An inlet of an IAC (idle adjustment control) passage is open in a zone between a position downstream of the tapered portion 8 in the vicinity of the outlet section 10 of the auxiliary flow passage 3 and a position upstream of the throttle valve 7. An outlet of the IAC passage is open in a zone downstream of the throttle valve 7.

Figure 5:
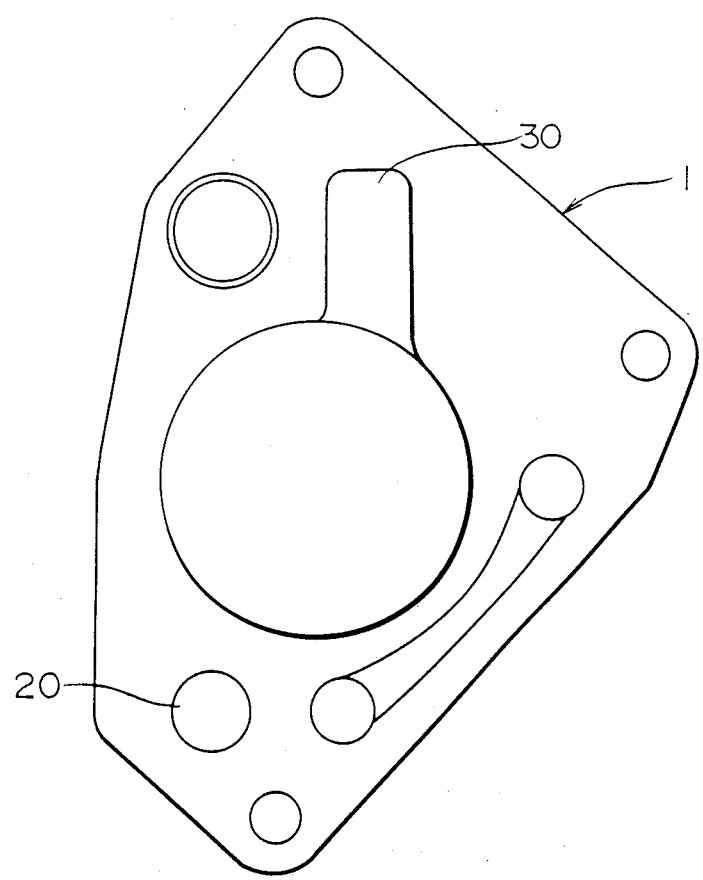
FIG. 5 is an enlarged bottom view illustrating a state of the internal passages of the air flow meter according to the second embodiment of the present invention.
Figure 6:
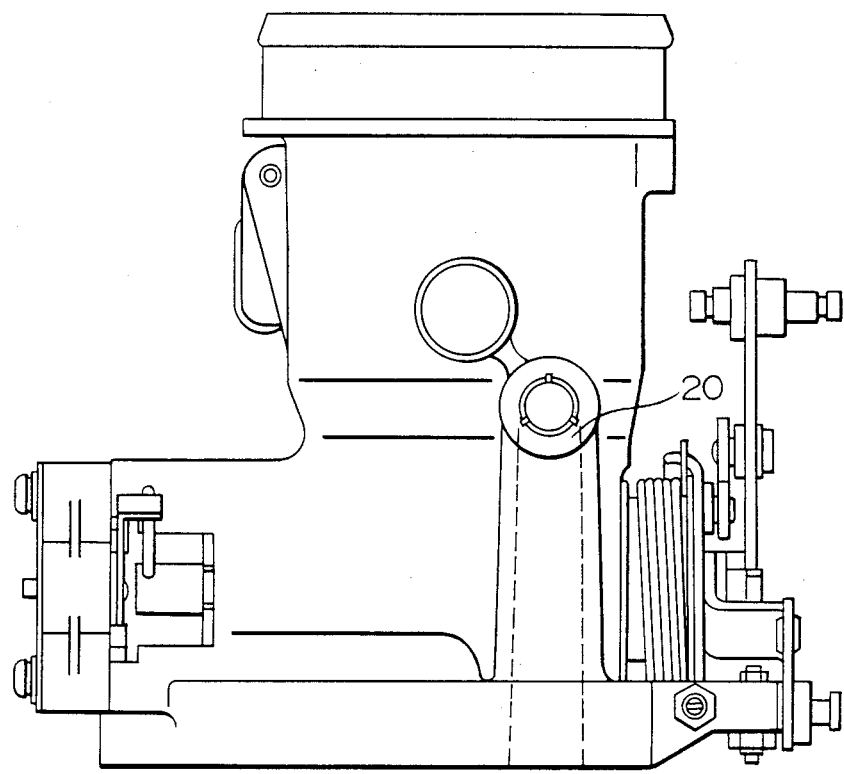
FIGS. 6 and 7 are side views of the second embodiment as taken from different directions, respectively.
Figure 7:
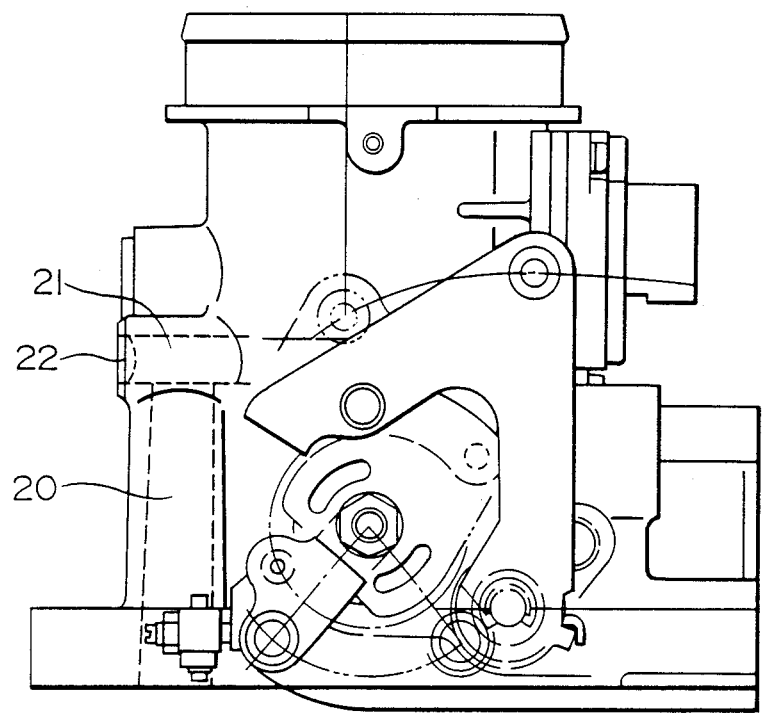
Figure 8:
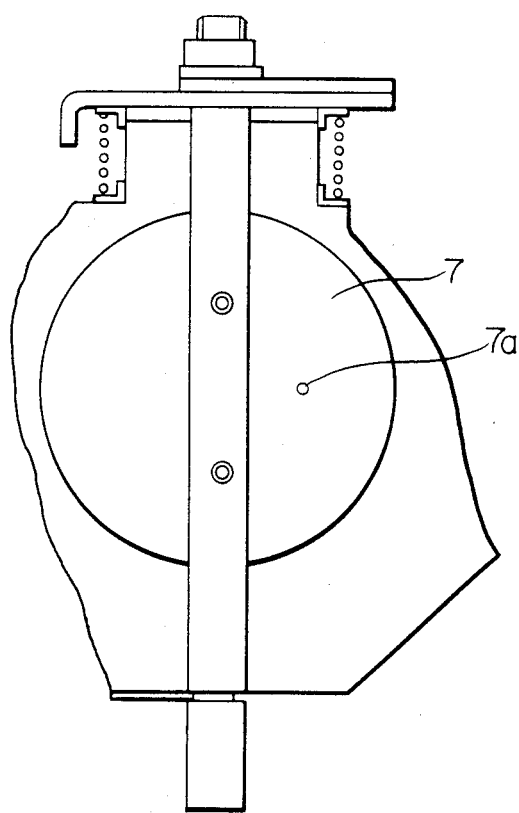
FIG. 8 is a view illustrating a throttle valve.
Figure 9:
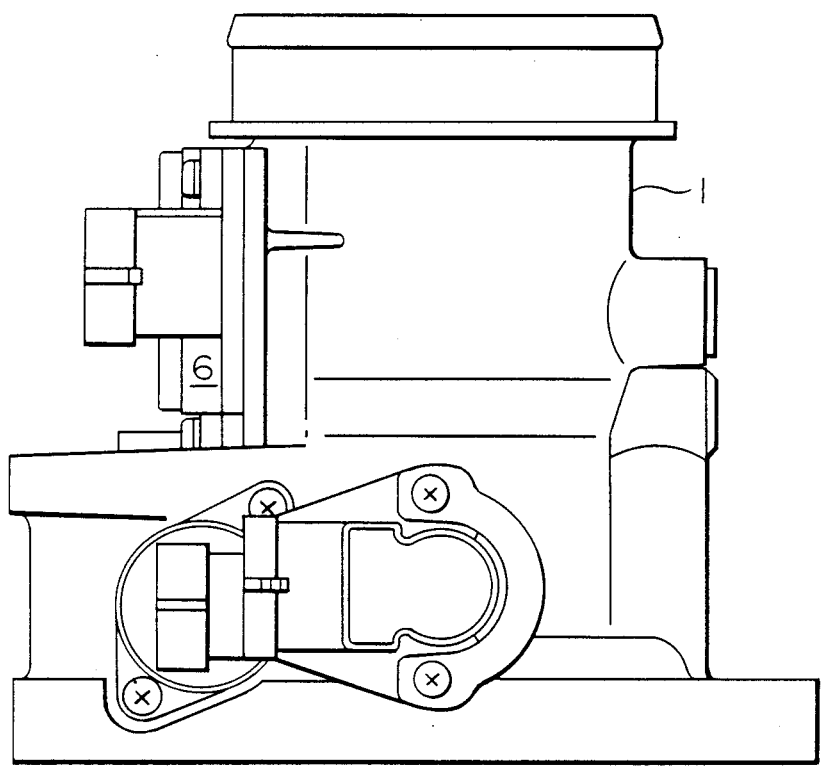
FIGS. 9 and 10 are side views showing the manner in which a hot-wire module is mounted.
Figure 10:
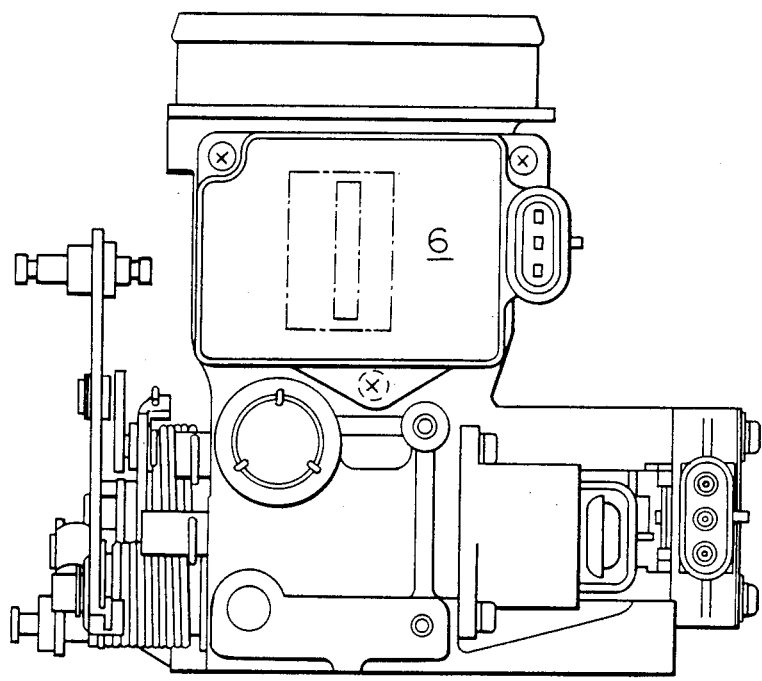

A blowby gas refluxing passage 20 is constructed as follows. Namely, the blowby gas refluxing passage 20 which is open into an intake manifold is allowed to pass through the contact surfaces of the intake manifold with the throttle body 1 and extend in parallel with the primary flow passage 2 of the throttle body. Thereafter, the blowby gas refluxing passage 20 is orthogonally bent in an upstream zone of the throttle valve 7 where the passage 20 confluxes into the primary flow passage 2 (see FIGS. 5 and 6). The blowby gas passage 20 which is parallel to the primary flow passage 2 is formed by die casting but undergoes no mechanical fabrication. For this reason, the passage 20 is tapered (FIG. 6). The passage 21 which is orthogonal to the blowby gas passage 20 is fabricated from outside the throttle body 1 to the primary flow passage 2 and is closed by a plug 22 from outside (see FIG. 7). The outlet or refluxing port of the blowby gas refluxing passage 20 is located at the inner wall surface of the primary flow passage in a zone where no member obstructs that outlet when the same is viewed from the upstream side of the primary flow passage.

Between the contact surfaces of the intake manifold with the throttle body 1 sealing is applied to render ineffective the communication between the blowby gas passage 20 and the open air.

The IAC passage is constructed as follows. That is, as seen in FIG. 5 IAC-passage opening at the side of the intake manifold is formed by a groove 30 in the underside of the throttle body 1 while the lower side portion of that opening is formed by an upper surface of the intake manifold. The IAC passage opening is sealed from outside by the gasket for sealing the interspacing between the throttle body and the intake manifold.

The throttle valve 7 is constructed as follows. Namely, the throttle valve 7 is a pressed article constituted by an Al plate member, and an outer peripheral surface thereof is not subjected to machining. The throttle valve 7 has a bore 7a so as to permit a specified amount of air to leak when it is totally closed (see FIG. 8).

As a position spaced by 13 mm away from the mesh 12 toward the downstream side, the mesh 12 being disposed at the inlet of the primary flow passage, the inlet of the auxiliary flow passage is disposed in parallel with the primary flow passage, and the auxiliary flow passage is made eccentric by 20 mm from the axis of the primary flow passage. The inlet portion of the auxiliary flow passage 3 is rounded by die casting. The auxiliary flow passage is formed with a fabricated bore in such a manner that the bore is continuous to the rounded shape and that the bore extend in parallel with the primary flow passage. The auxiliary flow passage includes a hollow-cylinder like member A having said fabricated bore and a hollow-cylinder like member B intersecting the member A at right angles, the member B crossing the primary flow passage in the form of a bridge. The two hollow-cylinder like members A and B are made integral with each other. At a corner defined between the members A and B is provided a rib 3a extending in parallel with the primary flow passage, thereby improving the fluidity of die casting and mechanical strength. The hollow-cylinder like member B is orthogonal to that of the hollow-cylinder like member A. The wall of the throttle body 1 which corresponds to the hollow-cylinder like member A has a larger thickness at the position of a hot-wire module so as to accommodate therein the break-preventing type.

The outer configuration of the throttle valve 1 is constructed as follows. The outer peripheral surface of the throttle body 1 is formed with a flat plate parallel to the primary flow passage in such a manner as to be integral with the throttle body 1, whereby the hot wire module 6 is mounted on that flat plate by means of screws (see FIGS. 9 and 10).

According to the second embodiment explained above in connection with FIGS. 3 to 10, the mesh 12 is provided at the inlet portion of the primary flow passage 2. In addition, the tapered portion 8 is provided and the outlet portion 10 of the auxiliary flow passage 3 is located in the vicinity of the tapered portion 8. For these reasons, the stabilization of air flow by the mesh 12 can be effected simultaneously with that of air flow by location of that outlet portion 10 in the vicinity of the tapered portion 8. Thus, even in the case where turbulent flow is likely to occur due to a different air cleaner or the like provided in front of the primary flow passage 2, it is possible to make a highly precise measurement of air flowrate.

According to the present invention, it is possible to reduce the turbulence of air flow at the section of the primary flow passage and auxiliary flow passage where air streams by restriction of the air flow. Therefore, when the invention is applied to the hot-wire type air flow sensor or the like, it is possible to lessen the variation in level of the measuring output. This makes it possible to conduct precise and stable measurement of air flow. Thus, it is possible to control air fuel ratio of the engine with high accuracy. Thus, it is possible to obtain with an inexpensive structure the effect of reducing the fluctuation in number of the engine revolution of an automobile.

What is claimed is:

1. An air flow meter for an internal combustion engine comprising an intake air passage of an internal combustion engine, said intake air passage being composed of a primary flow passage and an auxiliary flow passage having a specified length and having a portion which projects within said primary flow passage and is disposed substantially in parallel to the direction of an air flow passing through said primary flow passage, and a sensor for measurement of an intake air flow rate, said sensor being disposed within said auxiliary flow passage, said intake air passage further having a cross-sectional area change portion provided at a wall surface of said primary flow passage, said primary flow passage being changed in cross-sectional area at said cross-sectional area change portion, an outlet of said auxiliary flow passage being located in an area where the lines of an air flow in the primary flow passage are compressed by said portion of change in cross-sectional area, and wherein the auxiliary flow passage is disposed away from the center axis of said primary flow passage and in close proximity to a wall surface of said primary flow passage, and said outlet of the auxiliary flow passage is directed away from said wall surface of said primary flow passage.

2. An air flow meter for an internal combustion engine according to claim 1, wherein the center axis of said outlet of said auxiliary flow passage is located within a zone which extends from a first position corresponding to an end of reduction in cross-sectional area of said cross-sectional area change portion of said primary flow passage to a second position upstream of said first position and spaced from said first position by a distance corresponding to the radius of said primary flow passage upstream of said cross-sectional area change portion.

3. An air flow meter for an internal combustion engine according to claim 1, wherein the axis of said outlet of said auxiliary flow passage is located within a zone which extends from a first position corresponding to an end of reduction in cross-sectional area of said cross-sectional area change portion of said primary flow passage to a second position upstream of said first position and spaced from the beginning of reduction in cross-sectional area of said cross-sectional area change portion by no more than approximately the radius of said outlet.

4. An air flow meter for an internal combustion engine according to claim 1, wherein said cross-sectional area change portion of said primary flow passage is conical and the angle of said cross-sectional area change portion to the wall of said primary flow passage is not less than 10°.

5. An air flow meter for an internal combustion engine according to claim 1, wherein said cross-sectional area change portion of said primary flow passage is in the form of an internal step-walled hollow-cylinder having different diameters with a diameter transition therebetween.

6. An air flow meter for an internal combustion engine according to claim 4 or 5, wherein the diameter of a section of said primary flow passage upstream of said cross-sectional area change portion is 1.1. times or more as large as that of a section downstream therefrom.

7. An air flow meter for an internal combustion engine, comprising:
- a main passage forming part of an air intake flow passage of the internal combustion engine;
- a measuring element for measuring a quantity of air drawn in the main passage; and
- a member forming a bypass passage disposed in said main passage and containing said measuring element;
- wherein said main passage includes a throttled portion formed between the bypass passage and a position in said main passage where a throttle valve is to be located downstream of the bypass passage; and wherein said member forming said bypass passage has an L-shaped configuration including a first flow path portion formed in an axial direction of said main passage at a position offset from the center axis of said main passage, and a second flow path portion formed in a radially inward direction of said main passage and having an outlet opening into said main passage; and wherein the center axis of said outlet of said second flow path portion is located within a zone from the downstream end of said throttled portion to a position which is upstream therefrom by a distance corresponding to the radius of said main passage upstream of said throttled portion.

8. An air flow meter according to claim 7, wherein said throttled portion of said main passage is in the form of an internally step-walled hollow cylinder having different diameters with a diameter transition part therebetween.

9. An air flow meter according to claim 7, wherein the diameter of said main passage upstream of said throttled portion is 1.1 times the diameter of said main passage downstream of said throttled portion.

10. An air flow meter for an internal combustion engine, comprising:
a main passage forming part of an air intake flow passage of the internal combustion engine;
a measuring element for measuring a quantity of air drawn in the main passage; and
a bypass passage disposed in said main passage and containing said measuring element;
wherein said main passage includes a throttled portion formed between the bypass passage and a position in said main passage where a throttle valve is to be located downstream of the bypass passage;
wherein said bypass passage has an L-shaped configuration including a first flow path portion formed in an axial direction of said main passage, and a second flow path portion formed in a radially inward direction of said main passage and having an outlet opening into said main passage; and
wherein the downstream end of said throttled portion is located in said main passage in a region which extends from the center axis of said outlet of said bypass passage to a point spaced from the center axis of the outlet of said bypass passage downstream therefrom by a distance approximately equal to the radius of said main passage upstream of said throttled portion.

11. An air flow meter according to claim 10, wherein said throttled portion of said main passage is in the form of an internally step-walled hollow cylinder having different diameters with a diameter transition part therebetween.

12. An air flow meter according to claim 10, wherein the diameter of said main passage upstream of said throttled portion is 1.1 times the diameter of said main passage downstream of said throttled portion.

13. An air flow meter for an internal combustion engine, comprising:
a main passage forming part of an air intake flow passage of the internal combustion engine;
a measuring element for measuring a quantity of air drawn in the main passage; and
a member forming a bypass passage disposed in said main passage and containing said measuring element;
wherein said main passage includes a throttled portion formed between the bypass passage and a position in said main passage where a throttle valve is to be located downstream of the bypass passage; and
wherein said member forming said bypass passage has an L-shaped configuration including a first flow path portion formed in an axial direction of said main passage, and a second flow path portion formed in a radially inward direction of said main passage and being disposed at least partly within the area of said throttled portion.

14. An air flow meter according to claim 13, wherein said second flow path portion extends diametrically with respect to said main passage in a direction transverse to an axis of the throttle valve.

15. An air flow meter for an internal combustion engine, comprising:
a main passage forming part of an air intake flow passage of the internal combustion engine;
a measuring element for measuring a quantity of air drawn in the main passage; and
a bypass passage disposed in said main passage and containing said measuring element;
wherein said main passage includes a throttled portion formed between the bypass passage and a position in said main passage where a throttle valve is to be located downstream of the bypass passage;
wherein said bypass passage has an L-shaped configuration including a first flow path portion formed in an axial direction of said main passage at a position offset from the center axis of said main passage, and a second flow path portion formed in a radially inward direction of said main passage and having an outlet opening into said main passage; and
wherein said throttled portion is located in said main passage in a region which is contiguous to the second flow path portion of said bypass passage.

* * * * *